United States Patent
Thomson et al.

(10) Patent No.: US 10,225,159 B2
(45) Date of Patent: Mar. 5, 2019

(54) DYNAMIC GRAPH-BASED STRUCTURE FOR REPRESENTING A COMMUNICATIONS NETWORK

(71) Applicant: CENX, Inc., Ottawa (CA)

(72) Inventors: Joel Thomson, Ottawa (CA); Peter Elliott, Ottawa (CA); Edward Beingessner, Ottawa (CA)

(73) Assignee: CENX, Inc., Ontario (CA)

( * ) Notice: Subject to any disclaimer, the term of this patent is extended or adjusted under 35 U.S.C. 154(b) by 17 days.

(21) Appl. No.: 15/608,694

(22) Filed: May 30, 2017

(65) Prior Publication Data
US 2018/0351825 A1 Dec. 6, 2018

(51) Int. Cl.
| | |
|---|---|
| G06F 15/16 | (2006.01) |
| H04L 12/24 | (2006.01) |
| H04W 40/02 | (2009.01) |
| H04L 12/26 | (2006.01) |
| G06F 11/30 | (2006.01) |

(52) U.S. Cl.
CPC .............. *H04L 41/22* (2013.01); *H04L 41/12* (2013.01); *H04W 40/02* (2013.01); *G06F 11/3006* (2013.01); *H04L 43/045* (2013.01)

(58) Field of Classification Search
USPC ............ 709/224, 223; 370/228, 256; 380/28
See application file for complete search history.

(56) References Cited

U.S. PATENT DOCUMENTS

| | | | | |
|---|---|---|---|---|
| 8,310,957 B1* | 11/2012 | Rekhter | ............. | H04L 12/4641 370/256 |
| 2009/0248376 A1* | 10/2009 | Silva | ................... | H04L 41/5009 703/2 |
| 2010/0014657 A1* | 1/2010 | Kerschbaum | ....... | G06F 21/6245 380/28 |
| 2015/0207671 A1* | 7/2015 | Farkas | .................... | H04L 45/48 370/228 |
| 2016/0156514 A1* | 6/2016 | Salonidis | ................ | H04L 41/12 709/223 |
| 2017/0222912 A1* | 8/2017 | Atkinson | ................ | H04L 45/02 |
| 2018/0268078 A1* | 9/2018 | Gianetto | ........... | G06F 17/30958 |
| 2018/0270259 A1* | 9/2018 | Gianetto | ............. | H04L 63/1425 |

* cited by examiner

*Primary Examiner* — Thanh T Nguyen
(74) *Attorney, Agent, or Firm* — Sterne, Kessler, Goldstein & Fox P.L.L.C.

(57) ABSTRACT

Embodiments are disclosed for providing network management and application services for a telecommunications network. In an embodiment, data associated with a network entity in the telecommunication network may be received from a provider-specific data source, and the received data may include one or more data attribute values. The telecommunications network may be represented by a network graph containing vertices and edges, and each vertex may correspond to a respective network entity having a respective entity type. The plurality of edges in the network graph connected to the first vertex may be updated based on a linking rule that specifies a relationship between network entities having respective entity types, and a walk associated with the first vertex may be identified. The identified walk may then be dynamically executed from an intermediate starting vertex to generate one or more output entities.

24 Claims, 6 Drawing Sheets

DYNAMIC GRAPH-BASED STRUCTURE FOR REPRESENTING A COMMUNICATIONS NETWORK

FIELD

This disclosure generally relates to telecommunications network management and operations support.

BACKGROUND

Network data usage has increased rapidly in recent years. Network service users demand higher bandwidth with better quality and secure connectivity. Modern network service providers operate local, regional, and nationwide networks to provide connectivity to users. These networks are built with a variety of equipment to perform various tasks, and such equipment may be manufactured by multiple vendors. Each piece of equipment may be complex enough to handle hundreds to thousands of simultaneous connections, and different pieces of equipment may be widely dispersed across a region. Wireless base stations, for example, may be geographically distributed across a city to optimize coverage and efficiency.

To meet user demand, network operators are investing heavily in network infrastructure and new applications to increase network capacity and maintain consistent performance. Today's network infrastructure is evolving faster than ever due to significant innovations in high-speed mobile broadband, cloud-based applications, network functions virtualization (NFV), software-defined networking (SDN), carrier Ethernet, and IP virtual private networks (VPNs). These advances in network technologies are impacting the underlying networks upon all network service providers. Service providers, introduce 4G technology, cloud-based infrastructure. NFV, and SDN to better scale and manage their services and infrastructure assets. These dynamics have been fueling a transformation from TDM-based bandwidth services to carrier Ethernet and layer 3 IP services such as IP-VPN and Multiprotocol Label Switching (MPLS) connectivity.

For example, NFV and SDN are two emerging technologies that are expanding the transformation of service provider network services. NFV uses virtualization technologies to design, deploy, and manage network services. NFV decouples the network functions, such as firewall, network address translation (NAT), domain name service (DNS), load balancing, WAN optimization, and intrusion detection, from dedicated, hardware appliances so that these network functions can execute in software and processes running within virtual machines. SDN separates control and forwarding functions, centralizes management, and programs network behavior using well-defined interfaces. SDN enables network control to become directly programmable, and the underlying infrastructure can be abstracted from applications and network services. With SDN and NFV, service providers can provide differentiated, revenue-generating service offerings to their end customers while reducing operational costs and simplifying network management.

Another extension is Voice over Long Term Evolution (VoLTE), which allows service providers to offer voice communication services over their high speed 4G LTE infrastructures that was traditionally used for data only, maximizing the value, of service providers' investment. VoLTE is moving into mainstream production globally. As service providers are deploying VoLTE, service providers are also leveraging NFV technology to build out their VoLTE, infrastructure more efficiently and cost effectively.

These disruptive technologies lead to significant challenges for network service providers because network transformation is complex and labor-intensive. Service providers need to build out network infrastructure leveraging emerging technologies while also operating within their existing infrastructure and maintaining the high quality of service end users expect.

Accommodating new technologies can increase the complexity of network operations. The increased operational complexity may include, for example, lengthy circuit turn-up time, inventory inaccuracy, challenges in accurately resolving faults, or unreliable performance for high value applications such as video and VoLTE. To handle this complexity, today's mobile, wire line, and cloud data center service providers are looking for new ways to design, implement, and manage their network infrastructures.

Conventional operations support systems (OSSs) can no longer simply be tweaked to support end-to-end management of increasingly complex network infrastructures. Conventional OSSs are systems used by service providers to manage their networks (e.g., telephone networks or data networks). Conventional OSSs provide functionality including network inventory, fault management, service provisioning, and network configuration. Conventional OSSs often utilize, well-known, existing network management models to manage their network elements in service providers' network infrastructures. Well-known examples of network management models include FCAPS and OAMPT.

FCAPS stands for fault, configuration, accounting, performance, and security, which are categories that define network management tasks. FCAPS is the International Organization for Standardization (ISO) Telecommunications Management Network model and framework for network management. Fault management is related to identifying, correcting, and logging network problems (i.e., faults) to minimize network downtime. Configuration management is related to gathering configurations from network devices and applying configurations to network devices. Configurations may be hardware and programming changes, including the addition, deletion, or modification of network equipment and programs in the communications network. Accounting management focuses on gathering network usage statistics so that individual users, departments, or business units can be properly billed for accounting purposes. Performance management is concerned with managing the overall performance of the network and ensuring that network performance remains at acceptable levels. Security management is related to protecting the network against unauthorized access.

Another well-known network management model is OAMPT. OAMPT stands for operations, administration, maintenance, provisioning, and trouble shooting. OAMPT describes five types of network management tasks: operational management, administration, maintenance, provisioning, and troubleshooting. Operational management is concerned with day-to-day normal network operations. Administration includes support procedures for day-to-day operations. The support procedures can include, for example but not limited to, common passwords, equipment and tools access, and customer service report. Maintenance focuses on configuration and hardware changes in response to system deterioration. These changes include, for example but not limited to, scheduling service provider maintenance, standard network equipment configuration changes, routine equipment checks, hardware changes, and software/firmware upgrades. Provisioning is related to configurations that add, update, and remove network hardware equipment and network services. Troubleshooting involves diagnosis of network failures.

Regardless of the management model used, existing OSSs need to be highly customized to adapt, to differing network architectures of different service providers. Providers are constantly adding new services and infrastructure, and OSS software constantly needs to be updated to continue to provide useful network management applications. This often requires collaboration between separate network engineers and software developers and can lead to increased costs and development complexity.

SUMMARY

Provided herein are system, apparatus, device, method, and/or computer program product embodiments, and/or combinations and sub-combinations thereof, for providing network management and application services for a telecommunications network. In an embodiment, data associated with a network entity in the telecommunication network may be received from a provider-specific data source, and the received data may include one or more data attribute values. The telecommunications network may be represented by a network graph containing vertices and edges, and each vertex may be associated with a corresponding network entity having a respective entity type.

The received data may be associated with a first vertex in the network graph. A rule specifying a relationship between a data attribute of a first entity type and a data attribute of a second entity type may then be retrieved from a provider-specific customization document. The plurality of edges in the network graph connected to the first vertex may be updated based on the rule, and a walk associated with the first vertex may be identified. The walk may have a walk definition that specifies the entity, type of the starting vertex, the traversable edge types, and instructions on what output entities to generate. The identified walk may then be dynamically executed from an intermediate starting vertex to generate one or more output entities.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example Graph Processing Engine

Telecommunications network architectures are increasing in complexity to adapt to increasing demand. Data structures employed to represent, the topological structure of a network must be flexible enough to represent complex mesh topologies with multiple and redundant connections to and from entities within the network. On top of this, entities within modern networks are constantly changing due to employment, of NFV and SDN technologies within the network. For these reasons, tree- and list-based structures are often insufficient, and embodiments described employ graph-based data structures to represent provider-specific networks.

Moreover, while service providers often use similar technologies, each provider structures and configures their networks differently. A service provider in this context may refer to a network service provider, an Internet service provider, an enterprise network administrator, or any individual or organization managing a telecommunications network. For example, each provider may set their own standards of how their networks are physically connected, specify configuration standards and naming conventions for various network entities, and define, services being provided by each network. Operations support systems (OSS) are often provided by OSS vendors to different service providers, and the features of the OSS must be able to efficiently adapt to each provider's conventions and configuration.

Figure 1:
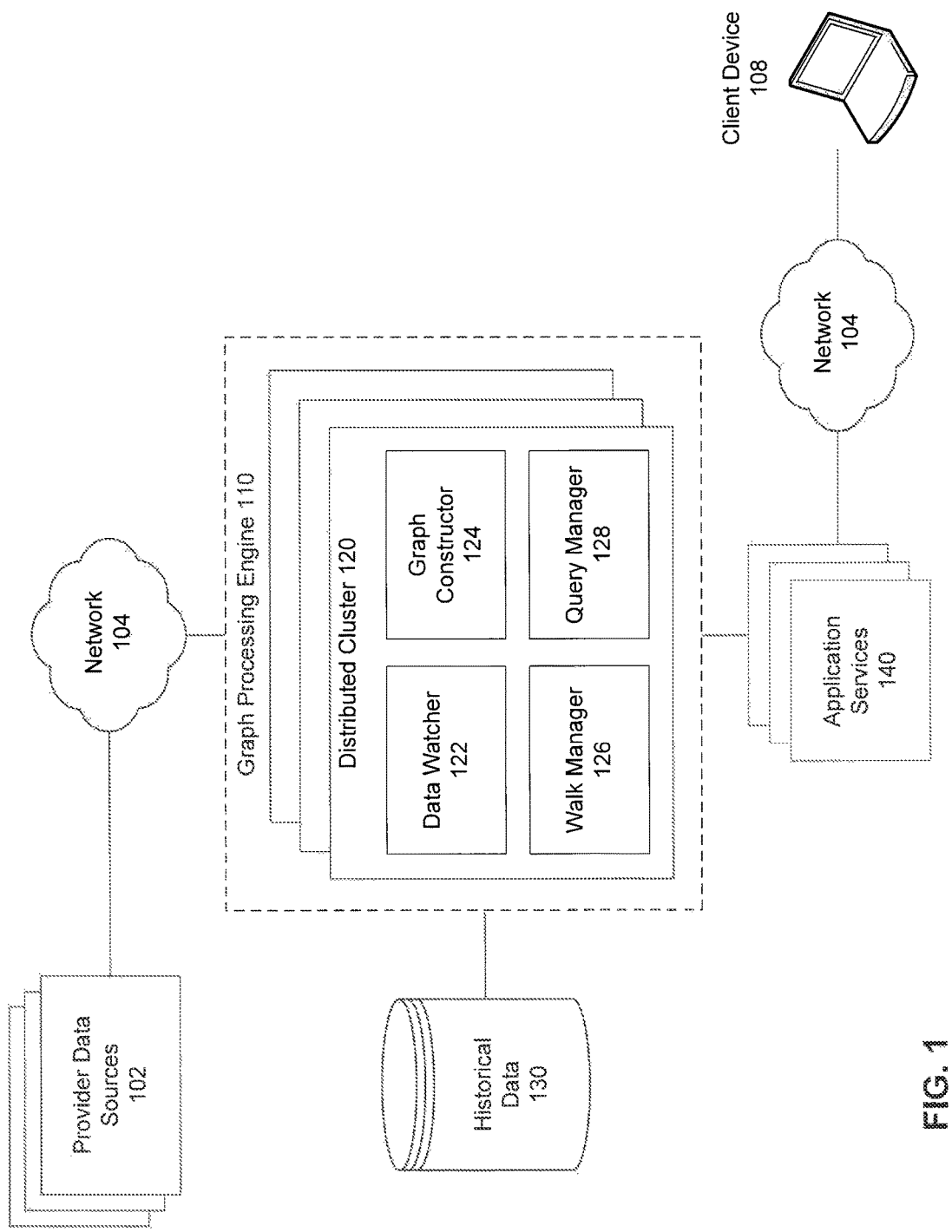
FIG. 1 is a diagram illustrating an example system for providing network management and application services for a telecommunications network, according to an embodiment.

FIG. 1 is a diagram illustrating an example system 100 for providing network management and application, services for a telecommunications network, according to an embodiment. In an embodiment, system 100 may include at least one provider-specific data source 102, a network 104, a client device 108, a graph processing engine (GPE) 110, an historical data store 130, and application services 140. GPE 110 may be coupled to provider-specific data source 102 via network 104. Network 104 may be any type of network capable of communicating, data, such as for example, a wired or wireless local area network or a wide area network (e.g., the Internet), or any combination thereof. GPE 110 may also be coupled to historical data store 130 and application services 140 via a network, such as, network 104 or another internal network. GPE 110, historical data store 130, and application services 140 may be part of a larger operations support system (OSS) used, to provide network management and application services to network service providers and operators. Application services 140 may be coupled to client device 108 via network 104 or another network, and client device 108 may be any type of computing device, such as and without limitation, a desktop, laptop, or mobile device.

A telecommunications network may include various network entities and connections or relationships between those entities. In an embodiment, a network entity may refer to any physical or logical network object, such as but not limited to, a router, network interface, network port, or demarcation point, or any portion of or information associated with such network objects. A network entity may also represent features, functions, and capabilities that are provided by such network objects, or particular data attributes of such network objects. Additionally, network entities may represent data associated with such network objects, such as sales data, management groups, regions, or other administrative or descriptive data.

The network entities of the telecommunications network may be represented as vertices in a graph-based structure, which may be referred to herein as a network graph. Connections and relationships between entities may be represented as edges in the network graph. For example, a router may be connected to a particular port, which may be represented as an edge in the network graph. According to an embodiment, multiple vertices may also form additional or larger network entities in combination. In an embodiment, GPE 110 may construct and process a network graph for a provider's network based on data received from the provider, as will be discussed further below.

In an embodiment, GPE 110 may include a distributed cluster 120 for processing network data in a distributed and parallel manner. Distributed cluster 120 may provide coordinated processing across one or more computer or processing devices, for example but, not limited to computer system 500 of FIG. 5. The one or more computing devices of distributed cluster 120 may be virtually, physically, and/or geographically separated.

In an embodiment, distributed cluster 120 may include data watcher 122, graph constructor 124, walk manager 126, and query manager 128. Data watcher 122 may either receive or retrieve data associated with network entities in a service provider's network from provider-specific data sources 102. These data sources may include, for example and without limitation, network and device configuration files, manually created architectural specifications, network analytics processes, network equipment and performance monitors, and provider data application programming interfaces (APIs), for example to access a database managed by a provider. In an embodiment, a provider-specific data source 102 may deliver data to a secure location within the OSS, and data watcher 122 may monitor the location and retrieve new data upon detection.

When data watcher 122 receives new data from a provider-specific data source 102, data watcher 122 may pass the data to graph constructor 124. Graph constructor 124 may process the data to constrict a network graph for the service provider. In an embodiment, the data may be associated with a particular network entity in the telecommunications network and include one or more data attributes of the network entity. Graph constructor 124 may determine whether the network entity corresponds to an existing vertex in the network, and if so, the data may be associated with the existing vertex. Otherwise, graph constructor 124 may add a new vertex to the network graph.

In an embodiment, linking rules may be used to determine source and destination endpoints on each vertex based on the data associated with that vertex. Each endpoint may be defined to include the name or other identifier of the linking rule used and at least one data attribute of the vertex. An edge may be created for every matching source and destination endpoint pair, as discussed in more detail below. In an embodiment, graph constructor 124 may retrieve, a provider-specific customization document, containing a list of linking rules that specify relationships between types of entities in the network. Each rule may have a unique name or other identifier and specify a source entity type and data attribute of that entity, and a destination entity type and data attribute of that entity. For example, a linking rule may specify that a network entity of type router that includes a particular IP address (source) be connected to a network entity of type port that has a matching IP address (destination). This linking rule may create a directed edge in the network graph from the vertex representing the router to the vertex, representing the port.

In an embodiment, when the data associated with a new or existing vertex is received from data watcher 122, graph constructor 124 may iterate through one or more linking rules in the customization document to determine whether to add or remove edges from the network graph. To accomplish this, graph constructor 124 may compare the source and destination endpoints of the vertex with source and destination endpoints of existing vertices within the network graph. When a match between the data attributes specified by a linking rule is found between an endpoint of the vertex associated with the received data and an endpoint of another vertex in the network graph, graph constructor 124 may create an edge between the two vertices. Similarly, if an edge previously existed between the vertex associated with the received data and another vertex, graph constructor 124 may detect when a match is no longer found between endpoints of the two vertices and remove the edge from the network graph. This scenario may occur when data received from a provider-specific data source 102 updates the values of one or more data attributes of the vertex.

To compare source and destination endpoints of the vertex and the network graph, in an embodiment, graph constructor 124 may first divide endpoints into four data sets: source endpoints associated with the vertex, destination endpoints associated with the vertex, existing source endpoints of the network graph, and existing destination endpoints of the network graph. Graph constructor 124 may then join the data sets together on data attributes shared between source and destination endpoints. In an embodiment, graph constructor 124 may perform joins of (1) the source endpoints of the vertex and the existing destination endpoints of the network graph and (2) the existing source endpoints of the network graph and the destination endpoints of the vertex. Because the set of endpoints of the vertex is expected to be small compared to the existing endpoints of the network graph, this join process reduces overall processing by limiting the size of at least one data set involved in the join operation.

When constructing and updating the network graph, iterating through each linking rule of the provider-specific customization document and each vertex of the network graph may be time consuming. As a result, in an embodiment, graph constructor 124 may store source and destination endpoints associated with each linking rule, for example in a hash map. When the data associated with a new or existing vertex is received from data watcher 122, the source and destination endpoints of the received data may then be used to determine which linking rules are applicable, and only these linking rules need to be evaluated to update the edges of the network graph. This reduces the number of source and destination endpoints that need to be compared to determine whether to add or remove edges from the network graph.

The operations perforated by graph constructor 124 enable the network graph of a provider to be constructed and updated incrementally as new data becomes available to GPE 110. In an embodiment data received from provider-specific data sources 102 may be processed in batches, rather than each time new data is received. In this case, the batch data may be associated with multiple vertices within the network graph. Graph constructor 124 may perform similar comparisons as previously discussed to determine addition and removal of edges from the network graph, and may also compare source and destination endpoints within the batch data itself to update edges in the network graph. In an embodiment, this may be accomplished by performing a third join operation, in addition to the two discussed above, on the source and destination endpoints of the batch data. For example, the batch data may be associated with two vertices in the network graph that are connected based on a shared data attribute of the vertices. In an embodiment, the network graph constructed by graph constructor 124 may be stored in memory across distributed cluster 120 for efficient access to data within the network graph.

In an embodiment, graph constructor 124 may also determine whether to delete a vertex based on data received from a provider-specific data source 102. For example, modern networks may employ NFV and SDN technologies to dynamically create new network elements during peak demand and remove the network element when demand decreases. Graph constructor 124 may determine that a vertex no longer exists based on, for example, data related to inventory of a provider's network or other information/ instruction received from the provider. When deletion of a vertex is determined, graph constructor 124 may remove the vertex and all edges connected to the vertex from the network graph, as well as update other affected data used by graph constructor 124, for example stored lists of existing source and destination endpoints in the network graph.

According to an embodiment, the data attributes of vertices may also be traceable back to their original data source. This lineage data for each data attribute may be stored in memory with the network graph or stored in a separate data store, such as historical data store 130. For example, an Internet Protocol (IP) address of a network interface may be traced back to a particular router configuration file retrieved from a network router. Query manager 128 may facilitate retrieval of lineage data for a vertex or particular data attributes upon request from an operator (e.g., via client device 108).

Once the vertices and edges of the network graph have been constructed, in an embodiment, walk manager 126 performs walks upon the network graph. A walk may refer to a traversal of one or more vertices and edges in the network graph to generate a specified output. In an embodiment, a walk may be defined in a walk customization document, which may specify at which vertices to start the walk, which edges of the network graph to traverse, and what output to produce from the walk. In an embodiment, a walk may include multiple starting vertices, and execution of the walk may be performed, in parallel across multiple threads within distributed cluster 120. For example, the walk customization document may specify a particular entity type, such as a router, or network switch, as the starting vertices and execute the walk from vertices of that type within the network graph. The walk customization document may additionally or alternatively specify a particular network entity as the starting vertex of the walk, rather than an entity type. In an embodiment, the walk customization document may also specify to start at vertices that include a particular data attribute or match a particular data attribute value.

Once starting vertices are determined for a walk, walk manager 126 may decide which edges connected to the starting vertices to traverse. The walk customization document may define which edges of the network graph to evaluate when making this determination. This edge traversal may be defined using multiple techniques, depending on the needs of the implementer.

A first technique for defining edge traversal, according to an embodiment, may be to define edges to traverse in terms of the entity type of the current vertex. In this case, the walk definition in the walk customization document may include, for specified entity types, edge types to traverse and a direction of traversal. The specified edge type may refer to the identifier of the linking rule that was originally used to create that edge. For example, the walk definition may specify for entity type "router" to traverse edges that connect entities of type "router" to entities of type "port" in direction from router (source) to port (destination). The relationship connecting entities of type "router" and entities of type "port" may have been defined in the provider-specific customization document discussed previously as a linking rule with a unique identifier.

A second technique for defining edge traversal, according to an embodiment, may use a nested tree-based structure. In this case, the walk customization document may specify edges to traverse from intermediate vertices traversed during the walk, taking into account the previous, vertices and/or edges traversed. For example, the walk definition may specify to traverse a first and second, edge type from the starting vertex, and then traverse a third edge type from vertices connected to the first edge type. In this example, edges of the third edge type would not be traversed from vertices connected to the second edge type. In an embodiment, this type of edge traversal may be represented by a series of nested lists or hash maps, each representing the edge types to traverse after traveling a particular path.

Using the walk definition from the walk customization document, walk manager 126 may identify edges of the network graph to traverse based on the edge type and direction of the edge. For each destination vertex of a traversed edge, walk manager 126 may repeat the process to determine which edges to traverse from the destination vertex. When walk manager 126 determines that no further edges of the network graph should be traversed, the walk may end for example when all nested edge traversals have been evaluated using the nested tree-based approach discussed above. In an embodiment, walk manager 126 may traverse an edge by transmitting a message from the source vertex to the destination vertex. For example, information related to the source vertex may reside on a different computing device within distributed duster 120 from information related to the destination vertex. The message may include the starting vertex of the walk and the path (vertices and edges) traversed prior to the destination vertex. This message passing mechanism obviates the need for walk manager 126 to separately store the state of a walk, enabling walks to be performed across distributed cluster 120 by simply passing messages between devices containing the current state of a walk.

The traversed vertices of the walk may form sub-graphs within the larger network graph. Walk manager 126 may then generate output based on data associated with vertices of the traversed sub-graphs. This data may include all data attributes of each vertex, or particular data attributes specified in the walk definition in the walk customization document. In an embodiment, the walk definition may include an ending procedure to apply to the vertices of the traversed sub-graphs. This enables network providers, operators, or OSS vendors to customize how to process the sub-graphs of the walk and generate the output. Further details of walk traversal paths are discussed with respect, to FIG. 2A.

In an embodiment, the ending procedure may generate one or more output entities from the traversed vertices of the walk. For example, a sub-graph may include all vertices forming a cell site within the telecommunications network. The sub-graph may include, for example, vertices representing a cell site router and an antenna residing within a particular cell site. In, another example, a sub-graph may include vertices forming a router within the telecommunications network, each vertex including particular data attributes from different provider-specific data sources 102 that together provide information about the router. The ending procedure may generate new network entities for the cell site or router in the previous examples that include all relevant data in the traversed sub-graphs. In some embodiments, these output entities may be added to the network graph and used by GPE 110 in processing of newly received data. For example, linking rules defined in the provider-specific customization document may relate to particular output entities produced by walk manager 126. One of skill in the art will appreciate that linking rules and definitions of walks may be hard coded or stored in a separate data store, rather than residing in the provider-specific and walk customization documents.

In an embodiment, the output entities may be passed to application services 140. Application services 140 may represent various services, application, and functionality provided by an OSS, for example and without limitation, network visualization services, data audit services, fault monitoring services, or inventory management applications. The output entities generated by walk manager 126 may provide input to application services 140. In an embodiment, walk manager 126 may output visualization entities as input to network visualization services that enable a network operator to visualize communications paths within a network in a graphical user interface, or as input to fault monitoring services that may be used to alert network operators of network issues as they arise.

In some embodiments, the output entities may be correlated to a service information model. The service information model may enable representation of various network architectures of different service providers by defining a series of base network entities used to represent the architecture of a telecommunications network. By correlating the output entities to these base entities, the service information model enables reuse of application services 140 across different network architectures of different service providers without a need to change the underlying implementation of application services 140. An example service information model is discussed in related U.S. patent application Ser. No. 15/046,039, which is hereby incorporated herein by reference in its entirety.

Following initial construction of the network graph and execution of all defined walks, GPE 110 may periodically receive updated data related to network entities within the telecommunications network from provider-specific data sources 102. For example, data attributes of existing network entities may be updated, new network entities may be created or existing network entities may be deleted. When updated data is received or retrieved by data watcher 122, the data is passed to graph constrictor 124 to update the network graph. This may be accomplished by adding or deleting vertices of the network graph, and comparing source and destination endpoints associated with the updated data to existing, source and, destination endpoints of the network graph to update the edges of the graph, as discussed previously. Once the vertices and edges of the network graph have been updated, walk manager 126 may re-execute affected walks defined in the walk customization document to regenerate appropriate output entities.

In an embodiment, walk manager 126 may first identify walks affected by the updated data by determining walks that traverse vertices or edges in the network graph that were updated based on the updated data. Each identified walk may then be performed again to update the output entities generated from the walk. However, re-executing each affected walk from its starting vertices may be inefficient, requiring walk manager 126 to unnecessarily redo valid processing previously performed.

According to an embodiment, walk manager 126 may dynamically execute affected walks from intermediate starting vertices in an effort to execute only affected portions of each walk. To accomplish this execution, walk manager 126 may store intermediate states of each walk in memory with the current state of the network graph. In an embodiment, an intermediate state of a walk may include messages received by a particular vertex traversed during the walk, which may include the starting vertex of the walk an the path of vertices and edges traversed before arriving at the particular vertex.

After updating the network graph based on the updated data, graph constructor 124 may pass the updated vertices and edges to walk manager 126. Walk manager 126 may then identify walks affected by the updated vertices and edges, as discussed above, and load previous intermediate states of each walk from the affected vertices and source vertices of the affected edges. This enables dynamic re-execution of walks only from the vertices that have been affected by the updated data, rather than re-executing, walks from the original starting, vertices. In an embodiment, walk manager 126 may further optimize a walk from an intermediate starting vertex by determining previous edges traversed (e.g., messages sent) from that vertex based on old data that has been updated. In this case, the walk need not traverse again edges that were previously traversed based on current data. This further minimizes incremental processing required by GPE 110 to re-execute walks in response to data updates. Further details of executing a walk from an intermediate starting, vertex are discussed with respect to FIG. 2B.

In an embodiment, historical data store 130 may store data related to a provider's network at particular points in time. Historical data store 130 may be any type of structured or unstructured data store, such as a relational, document-oriented, or object-oriented database. In some embodiments, data related to the vertices and edges of the network graph may be stored, the generated output entities may be stored, or any combination thereof that provides an operator with a representation of the telecommunications network at a particular point in time. In an embodiment, application services 140 may provide a service to an operator via client device 108 to view historical network data. Requests for historical data may be routed through GPE 110, and query manager 128 may interact with historical data store 130 to retrieve the desired data. Query manager 128 may then pass the data to the appropriate application service 140 to be presented to the operator. In this manner, historical data store 130 may allow an operator to view and analyze previous states of the network.

Figure 2A:
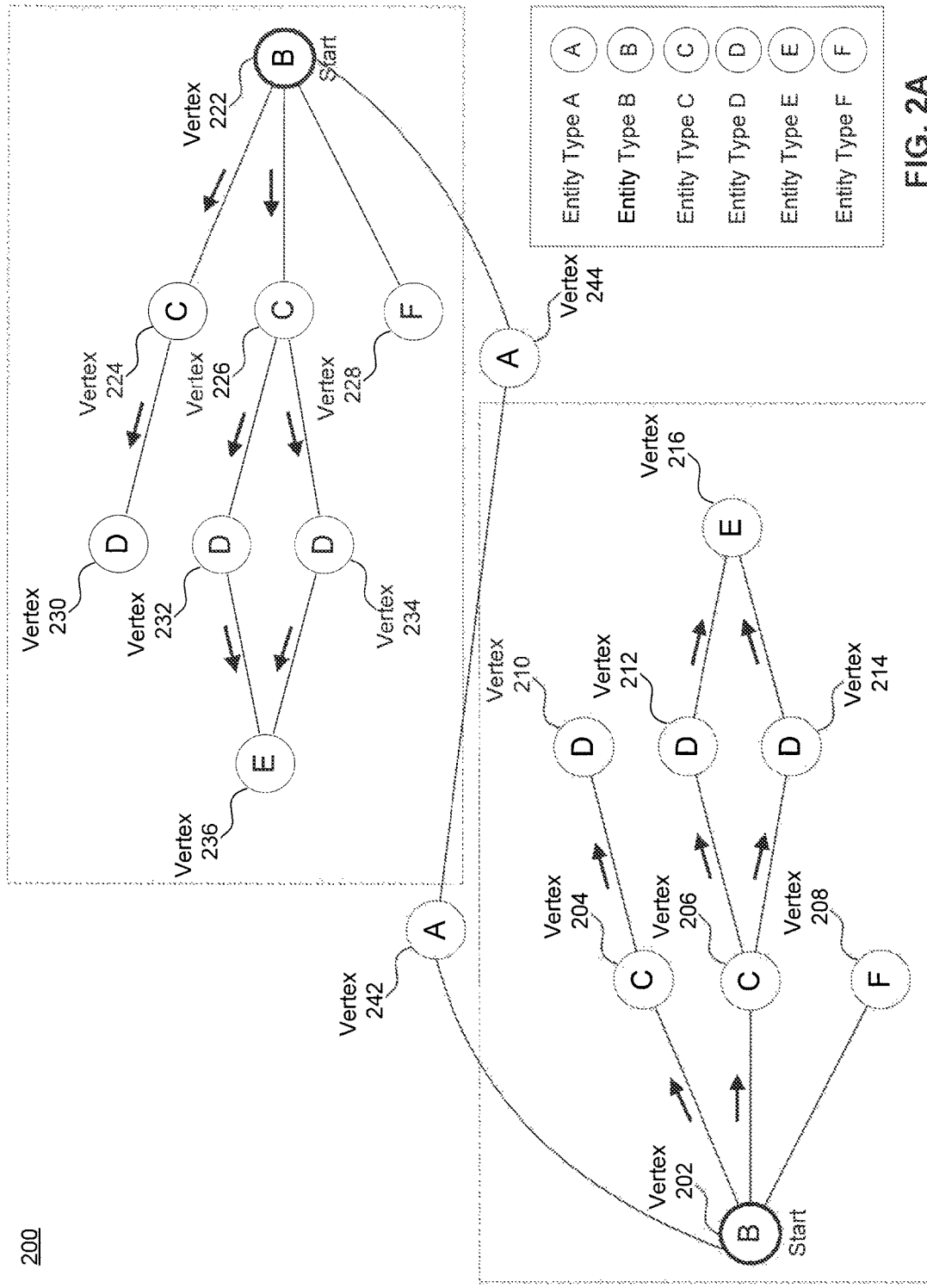
FIGS. 2A and 2B are diagrams illustrating an example network graph representing a telecommunications network, according to an embodiment.
Figure 2B:
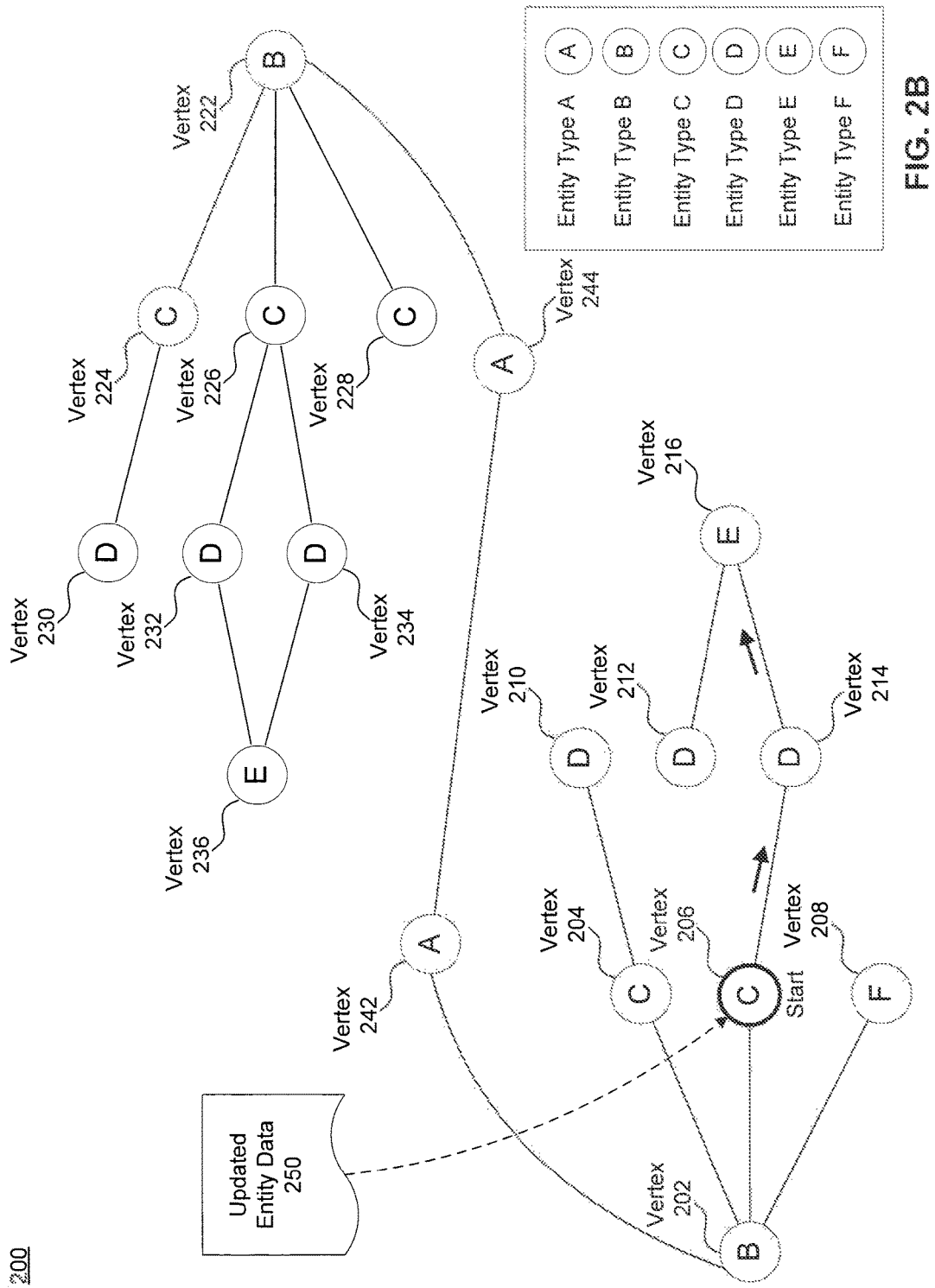

FIGS. 2A and 2B are diagrams illustrating, an example network graph 200 representing a telecommunications network, according to an embodiment. Network graph includes vertices 202-244. Each vertex may represent a network entity of a particular entity type, as illustrated in network graph 200. For example, vertices 202 and 222 represent network entities in the network graph of entity type B, and vertices 204, 206, 224, and 226 represent network entities of entity type C.

In an embodiment, a walk customization document may define a walk to start at vertices of corresponding to network entities of entity type B. In this case, a walk manager, such as walk manager 126 of FIG. 1, begins execution of a walk from vertices 202 and 222. The walk definition may further specify edge types connecting vertices of entity type B and entity type C with entity type B as the source vertex. As discussed with respect to FIG. 1, these edge types may correspond to the identifier of a linking rule specifying the relationship between entities of entity type B and entity type C. In an embodiment, the walk manager may transmit a message from vertex 202 to vertices 204 and 206, and from vertex 222 to vertices 224 and 226 containing information regarding the path traversed by the walk. Depending on the walk definition, the message may include all vertices and edges traversed, or only vertices traversed. In an embodiment, the walk manager may transmit messages across identified edges without knowledge of the destination vertex, which may be resolved at the endpoint of the edge.

When the messages are received by vertices 204, 206, 224, and 226, the walk manager may evaluate the messages to determine subsequent edges to traverse. For example, the walk definition, may specify edge types to traverse with entity type C as the source vertex. If the walk definition defines its traversal in a nested structure as discussed with respect to FIG. 1, the specified edges to traverse may depend on the previous vertices and edges traversed during the walk. In the example depicted in FIG. 2A, the walk definition may specify to traverse edges from vertices of entity type C to entity type D. In this case, the walk manager may transmit, messages from vertex 204 to vertex 210, vertex 206 to vertices 212 and 214, vertex 224 to vertex 230, and vertex 226 to vertices 232 and 234. This process may be repeated at the new active vertices, and messages may be transmitted from vertices 212 and 214 to vertex 216, and vertices 232 and 234 to vertex 236.

At vertices 216 and 236, the walk definition may specify no further edges to traverse with vertices of entity type E as the source. When this occurs, the walk may be terminated and proceed to the ending procedure. In the depicted example, the walk forms two sub-graphs within network graph 200: (a) vertices 202-216, with the exception of vertex 208, and (b) vertices 222-236, with the exception of vertex 228. As discussed with respect to FIG. 1, data associated with the vertices and edges of the traversed sub-graphs may be used by an ending procedure to generate output entities for use in various application services.

When updated data associated with a network entity in the network graph is received, as shown by updated entity data 250 of FIG. 2B, walks affected by updated entity data 250 may need to be re-executed. In this case, a graph constructor, such as graph constructor 224 of FIG. 1, may determine that data associated with vertex 206 has been updated by updated entity data 250, for example by updating values of data attributes associated with vertex 206. The graph constructor may have also deleted the edge connecting vertex 206 to vertex 212 based on updated entity data 250.

In an embodiment, the walk manager may dynamically perform the walk executed with respect to FIG. 2A by first loading a previous intermediate state of the walk at vertex 206. As discussed with respect to FIG. 1, the intermediate state of a walk at, vertex 206 may include messages received by vertex 206, which may include the starting vertex of the walk and the path of vertices and edges traversed before arriving at the vertex 206. With this intermediate state of the walk located, the walk manager may perform the walk as normal from vertex 206 by examining the walk definition in the walk customization document. In the depicted example, the walk manager may again send a message from vertex 206 to vertex 214, which may include the data updated with respect to vertex 206. However, because the edge has been deleted, no message will be sent from vertex 206 to vertex 212. The walk may continue to vertex 216 before terminating, and the ending procedure for the walk, may be re-executed taking into account the updated data and vertices traversed by the walk.

Example Method

Figure 3:
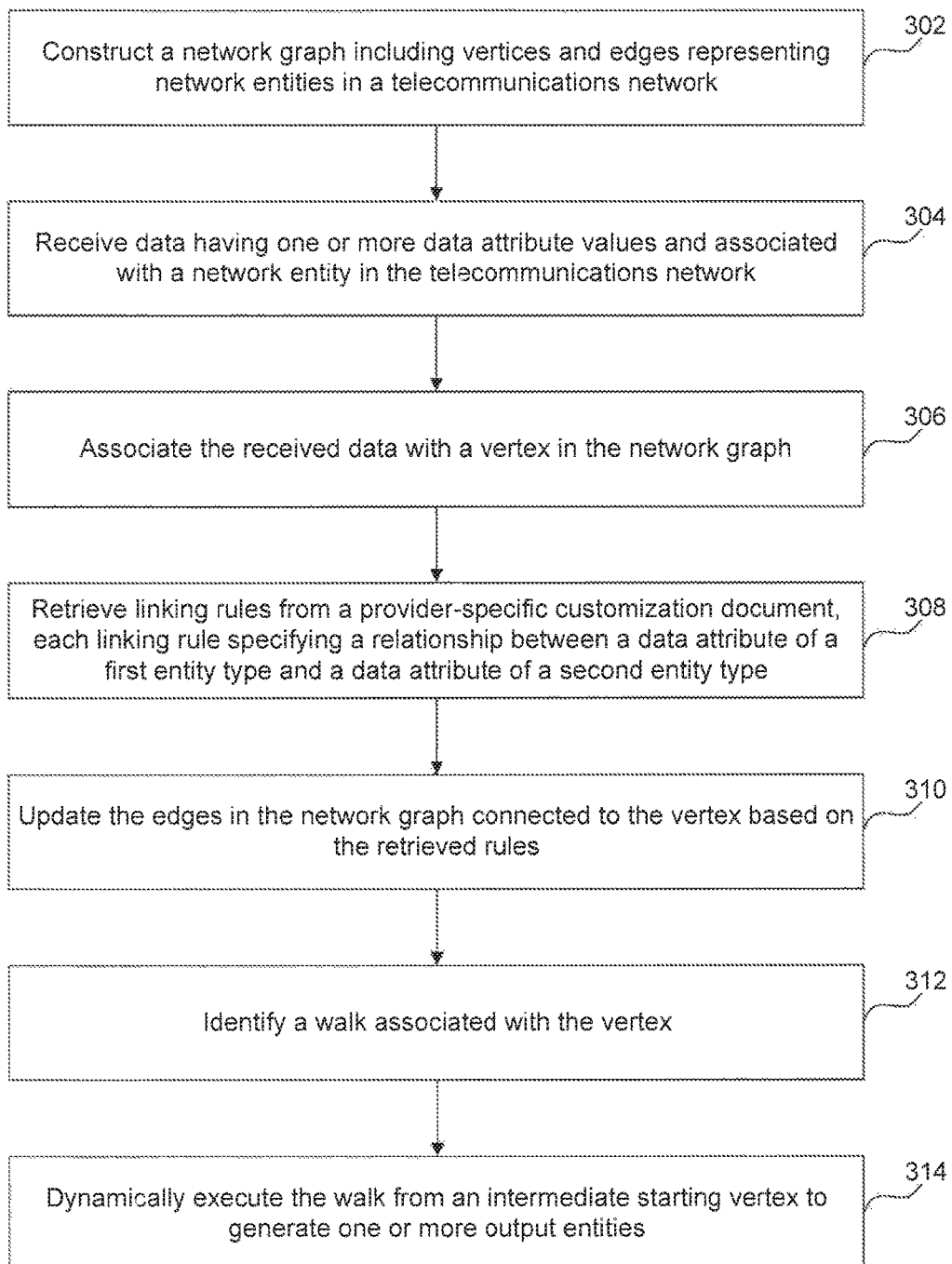
FIG. 3 is an example method for incrementally processing a graph-based structure representing a telecommunications network, according to an embodiment.

FIG. 3 is an example method 300 for incrementally processing a graph-based structure representing a telecommunications network, according to an embodiment. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, method 300 begins at stage 302 by constructing a network graph including vertices and edges representing network entities in a telecommunications network. Initially, data relating to network entities in the telecommunications network may be received from various provider-specific data sources, for example and without limitation, network and device configuration files, manually created architectural specifications, network analytics processes, network equipment and performance monitors, and provider data application programming interfaces (APIs), for example to access a database managed by a provider. In an embodiment, the network graph may be constructed from the received data as discussed with respect to graph constructor 124 of FIG. 1.

At stage 304, data including one or more data attribute values, may be received from a provider-specific data source, such as provider-specific data sources 102 of FIG. 1. The received data may be associated with a network entity in the telecommunications network. At stage 306, the received data may be associated with a vertex in the network graph. In an embodiment, if the vertex does not already exist, the vertex may be added to the network graph.

At stage 308, linking rules may be retrieved from, a provider-specific customization document. Linking rules may be used to determine source and destination endpoints on the vertex based on the data associated with the vertex. Each endpoint may be defined to include the name or other identifier of the linking rule used and at least one data attribute of the vertex. Each linking rule may specify a relationship between a data attribute of a first entity type and a data attribute of a second entity type. Each rule may have a unique name or other identifier and specify a source entity type and data attribute of that entity, and a destination entity type and data attribute of that entity. For example, a linking rule may specify that a network entity of type router that includes a particular IP address (source) be connected to a network entity of type port that has a matching IP address (destination). This linking rule may create a directed edge in the network graph from the vertex representing the router to the vertex representing the port. In an embodiment, a linking rule may specify a relationship between more than two entity types or contain logic involving multiple entity types within a relationship. For example, a provider may use two different entity types across different data sources that represent variations both applicable to the rule.

At stage 310, the edges in the network graph connected to the vertex identified at stage 306 may be updated based on the retrieved rules. To accomplish this, the source and destination endpoints of the vertex may be compared with source and destination endpoints of existing vertices within the network graph. When a match between the data attributes specified by a linking rule is found between an endpoint of the vertex associated with the received data and an endpoint of another vertex in the network graph, an edge may be created between the two vertices. Similarly, if an edge previously existed between the vertex associated with the received data and another vertex, stage 310 may detect when a match is no longer found between endpoints of the two vertices and remove the edge from the network graph. This scenario may occur when data received from a provider-specific data source updates the values of one or more data attributes of the vertex.

To compare source and destination endpoints of the vertex and the network graph, in an embodiment, endpoints may first be divided into four data sets: source endpoints associated with the vertex, destination endpoints associated with the vertex, existing source endpoints of the network graph, and existing destination endpoints of the network graph. The data sets may then be joined together on data attributes shared between source and destination endpoints. In an embodiment, join operation may be performed for (1) the source endpoints of the vertex and the existing destination endpoints of the network graph and (2) the existing source endpoints of the network graph and the destination endpoints of the vertex. Because the set of endpoints of the vertex is expected to be small compared to the existing endpoints of the network graph, this join process reduces overall processing by limiting the size of at least one data set involved in the join operation.

When updating the network graph, at stage 310, iterating through each linking rule of the provider-specific customization document and each vertex of the network graph may be time consuming. As, a result, in an embodiment, source and destination endpoints associated with each linking rule may be stored, for example in a hash map. When the data associated with a new or existing vertex is received, the source and destination endpoints of the received data may then be used to determine which, linking rules are applicable, and only these linking rules need to be evaluated to update the edges of the network graph. This reduces the number of source and destination endpoints that need to be compared to determine whether to add or remove edges from the network graph.

In an embodiment, stage 310 may also determine whether to delete a vertex based on the data received from the provider-specific data source. For example, as discussed with respect to FIG. 1, modern networks may employ NFV and SDN technologies to dynamically create new network elements during peak demand and remove the network element when demand decreases. The received data may indicate that a vertex no longer exists based on, for example, data related to inventory of a provider's network or other information/instruction received from the provider. When deletion of a vertex is determined, the vertex and all edges connected to the vertex may be removed from the network graph, and other affected data may be updated, for example stored lists of existing source and destination endpoints in the network graph.

At stage 312, a walk associated with the vertex may be identified. A walk may refer to a traversal of one or more vertices and edges in the network graph to generate a specified output. In an embodiment, a walk may be defined in a walk customization document, which may specify at which vertices to start the walk, for example by specifying, an entity type, which edges of the network graph to traverse, and what output to produce from the walk, as discussed with respect to FIGS. 1 and 2A. In an embodiment, the walk associated with the vertex may be identified by determining walks that traverse vertices or edges in the network graph that were updated based on the received data at stage 310.

Finally, at stage 314, the identified walk may be dynamically executed from an intermediate starting vertex to generate one or more output entities. In an embodiment, execution may be accomplished by loading an intermediate state of the walk from an affected vertex and re-executing the walk from the affected vertex, as discussed in more detail with respect to method 400 of FIG. 4.

In an embodiment, execution of the walk may generate visualization entities as the output entities that way act as input to network visualization services that enable a network operator to visualize communications paths within a network in a graphical user interface. Additionally or alternatively, the output entities may be correlated to a service information model that defines a plurality of base network entities used to represent an architecture of the telecommunications network, as discussed with respect to FIG. 1.

Figure 4:
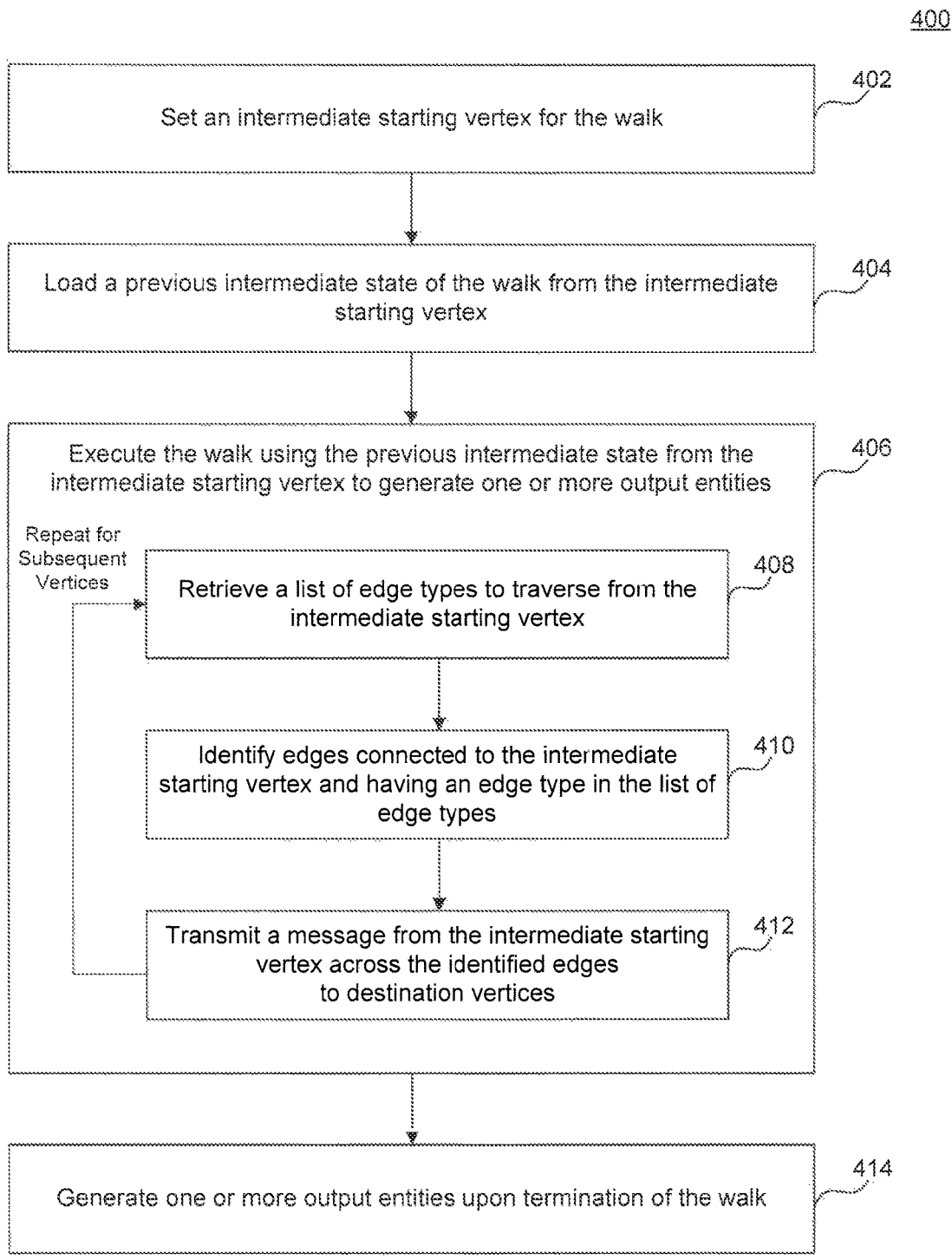
FIG. 4 is an example method for performing a walk of a graph-based structure from an intermediate starting point, according, to an embodiment.

FIG. 4 is an example method 400 for performing a walk of a graph-based structure from an intermediate starting point, according to an embodiment. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, method 400 operates upon a network graph similar to that of method 300. Method 400 begins at stage 402 by setting an intermediate starting vertex for the walk. In an embodiment, the intermediate starting vertex may be set to a vertex associated with a network entity that has been updated, such as the vertex identified in stage 306 of method 300, for example by updated data received from a provider-specific data source.

At stage 404, a previous intermediate state of the walk from the intermediate starting vertex may be loaded. In an embodiment, an intermediate state of a walk may include messages received by a particular vertex traversed during the walk, which may include the original starting vertex of the walk and the path of vertices and edges traversed before arriving at the particular vertex.

At stage 406, the walk may be executed using the previous intermediate state from the intermediate starting vertex to generate one or more output entities. Stage 406 includes stages 408-411 to perform the walk execution. At stage 408, a list of edge types to traverse from the intermediate starting vertex may be retrieved. In an embodiment, the list of edge types may be retrieved from a walk definition in a walk customization document.

The list of edge types may be defined using multiple techniques, depending on the needs of the implementer, as discussed with respect to FIG. 1. A first technique for defining the list of edge type to traverse, according to an embodiment, may be to define edges to traverse in terms of the entity type of the current vertex, in this case, the walk definition in the walk customization document may include, for specified entity types, edge types to traverse and a direction of traversal. The specified edge type may refer to the identifier of the linking rule that was originally used to create that edge. For example, the walk definition may specify for entity type "router" to traverse edges that connect entities of type "router" to entities of type "port" in direction from router (source) to port (destination). The relationship connecting entities of type "router" and entities of type "port" may have been defined in the provides-specific customization document discussed previously as a linking rule with a unique identifier.

A second technique for defining the list of edge types to traverse, according to an embodiment, may use a nested tree-based structure. In this case, the walk customization document may specify edges to traverse from intermediate vertices traversed during the walk, taking into account the previous vertices and/or edges traversed. For example, the walk definition may specify to traverse a first and second edge type from the starting vertex, and then traverse a third edge type from vertices connected to the first edge type. In this example, edges of the third edge type would not be traversed from vertices connected to the second edge type. In an embodiment, this type of edge traversal may be represented by a series of nested lists or hash maps, each representing the edge types to traverse after traveling a particular path.

At stage 410, edges connected to the intermediate starting vertex and having an edge type in the list of edge types may be identified. In an embodiment, a list of edges in the network graph may be stored in memory, and the edges extending from the intermediate starting vertex may be analyzed to determine whether the edge is of a type in the list of edge types.

At stage 412, a message may be transmitted from the intermediate starting vertex across the identified edges to destination vertices connected to the edges. In an embodiment, the message may include the starting vertex of the walk and the path (vertices and edges) traversed prior to the destination vertex. This message passing mechanism obviates the need to separately store the state of a walk, enabling walks to be performed across a distributed network of devices, such as distributed cluster 120 of FIG. 1, by passing messages between devices that contain the current state of a walk, as discussed with respect to FIG. 1.

In an embodiment, steps 408-412 may be repeated for each of the destination vertices and subsequent destination vertices until the walk is terminated, as discussed with respect to FIGS. 1, 2A, and 2B. Finally, at stage 414, one or more output entities may be generated upon termination of the walk. In an embodiment, the one or more output entities may be generated by an ending procedure of the walk, as discussed with respect to FIGS. 1, 2A, and 2B. The ending procedure may generate one or more output entities from the traversed vertices of the walk, including those traversed prior to the intermediate starting vertex, which may form one or more sub-graphs within the network graph.

For example, as discussed previously, a sub-graph may include all vertices forming a cell site within the telecommunications network. The sub-graph may include, for example, vertices representing a cell site router and an antenna residing within, a particular cell site. In another example, a sub-graph may include vertices forming a router within the telecommunications network, each vertex including particular data attributes from different provider-specific data sources that together provide information about the router. The ending procedure may generate new network entities for the cell site or router in the previous examples that include all relevant data in the traversed sub-graphs. In some embodiments, these output entities may be added to the network graph and used during processing of newly received data. The output entities may also be used as input to application services, such as application services 140, as discussed with respect to FIG. 1.

Example Computer System

Figure 5:
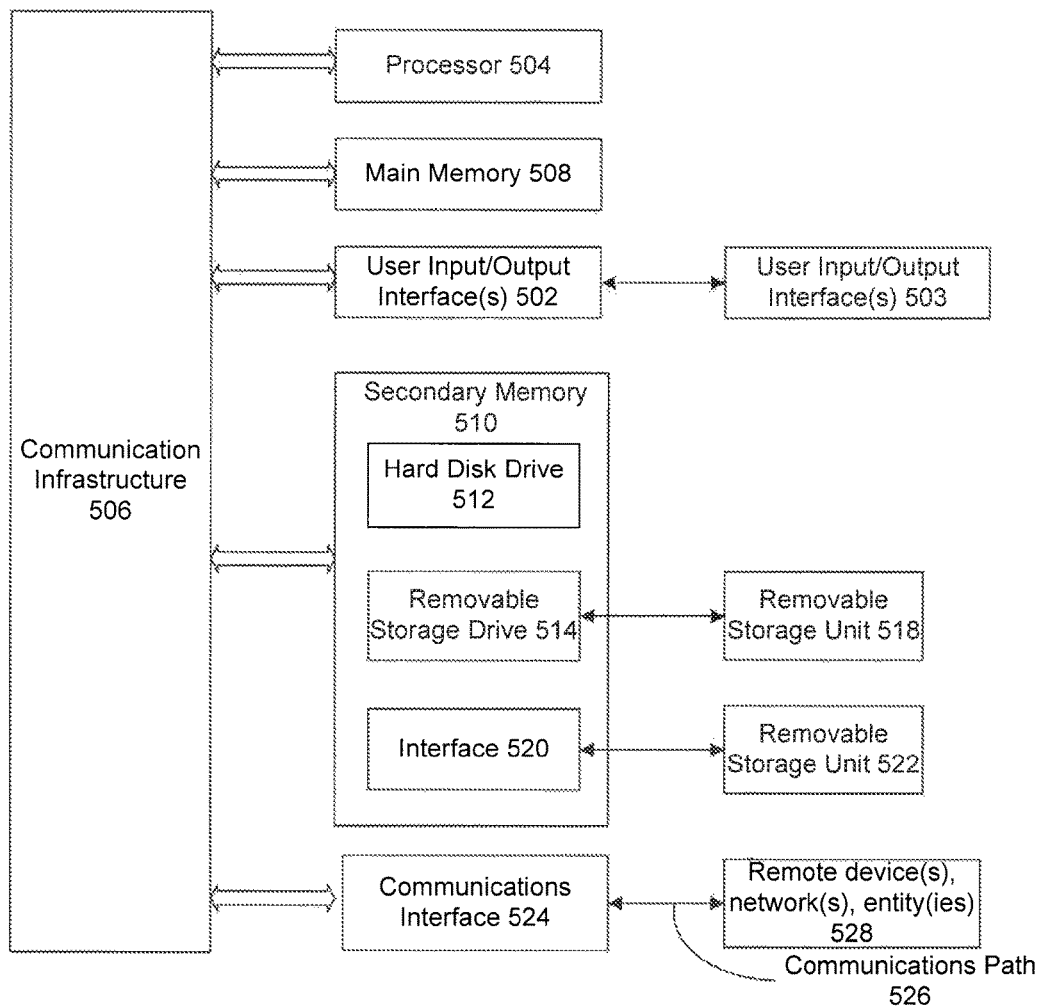
FIG. 5 is a diagram illustrating an example computing device, according to an embodiment.

FIG. 5 is a diagram, illustrating, an example computing system useful for implementing various embodiments. Various embodiments can be implemented, for example, using one or more well-known computer systems, such as computer system 500. For example, graph processing engine 110 can be implemented using computer system 500. In further examples, the methods of FIGS. 3 and 4 can be implemented using computer system 500. Computer system 500 can be any well-known computer capable of performing the functions described herein, such as computers available from International Business Machines. Apple. Sun, HP. Dell. Sony. Toshiba, etc.

Computer system 500 includes one or more processors (also called central processing units, or CPUs), such as a processor 504. Processor 504 may be connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The CPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/or any other computer data storage device. Removable storage drive 514 reads from and/or writes to removable storage unit 518 in a well-known manner.

According to an, exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product, program storage device, or computer-readable storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the inventions using, data processing devices, computer systems and/or computer architectures other than that shown in FIG. 5. In particular, embodiments may operate with software, hardware, and/or operating system implementations other than those described herein.

CONCLUSION

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein. Further, one of skill in the art will appreciate that application of the techniques and embodiments in this disclosure are not limited to a telecommunications network and may be applied to any type of network capable of being represented by a graph-based structure without departing from the spirit and scope of the disclosure.

It is to be appreciated that the Detailed Description section, and not any other section, is intended to be used to interpret, the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described, using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following, claims and their equivalents.

What is claimed is:

1. A computer-implemented method, comprising:
    receiving, from a provider-specific data source, data associated with a network entity in a telecommunications network, the received data having one or more data attribute values, wherein the telecommunications network is represented by a network graph having a plurality of vertices and a plurality of edges, each vertex associated with a corresponding network entity having a respective entity type;
    associating the received data with a first vertex in the network graph;
    retrieving a linking rule from a provider-specific customization document, the linking rule specifying a relationship between a data attribute of a first entity type and a data attribute of a second entity type;
    updating, based on the linking rule, the plurality of edges in the network graph connected to the first vertex;
    identifying a walk associated with the first vertex, the walk having a walk definition that specifies an entity type of a starting vertex within the network graph; and
    dynamically executing, the walk from an intermediate starting vertex to generate one or more output entities.

2. The method of claim 1, wherein updating the plurality of edges farther comprises:
    removing a first edge connected to the first vertex from the plurality of edges based on the linking rule; and
    adding a second edge connected to the first vertex to the plurality of edges based on the linking rule.

3. The method of claim 2, wherein identifying a walk associated with the first vertex further comprises:
    determining whether the first vertex is part of a previously executed walk; and
    determining whether the removed first edge or the added second edge is part of the previously executed walk.

4. The method of claim 1, wherein dynamically executing the walk further comprises:
    setting the intermediate starting vertex to the first vertex;
    loading a previous intermediate state of the walk at the intermediate starting vertex; and
    executing, using the previous intermediate state, the walk from the intermediate starting vertex to generate one or more output entities.

5. The method of claim 4, wherein executing the walk using the previous intermediate state further comprises:
    retrieving, from a walk customization document, a list of edge types to traverse from the intermediate starting vertex;
    identifying edges connected to the intermediate starting vertex and having an edge type in the list of edge types;
    transmitting a message from the intermediate starting vertex across the identified edges, wherein the message is received by destination vertices connected to the identified edges; and
    repeating the retrieving, the identifying edges, and the transmitting for each of the destination vertices.

6. The method of claim 1, further comprising:
    correlating each of the generated one or more output entities to a service information model that defines a plurality of base network entities used to represent an architecture of the telecommunications network.

7. The method of claim 1, further comprising:
    generating a visualization of communications paths within the telecommunications network using the generated one or more output entities.

8. The method of claim 1, further comprising:
    storing the plurality of vertices and the plurality of edges of the network graph in-memory across one or more distributed computing devices.

9. A system, comprising:
    at least one memory; and
    at least one processor coupled to the at least one memory and configured to:
        receive, from a provider-specific data source, data associated with a network entity in a telecommunications network, the received data having one or more data attribute values, wherein the telecommunications network is represented by a network graph having a plurality of vertices and a plurality of edges, each vertex associated with a corresponding network entity having a respective entity type;
        associate the received data with a first vertex in the network graph;
        retrieve a linking rule from a provider-specific customization document, the linking rule specifying a relationship between a data attribute of a first entity type and a data attribute of a second entity type;
        update, based on the linking rule, the plurality of edges in the network graph connected to the first vertex;
        identify a walk associated with the first vertex, the walk having a walk definition that specifies an entity type of a starting vertex within the network graph; and
        dynamically execute the walk from an intermediate starting vertex to generate one or more output entities.

10. The system of claim 9, wherein to update the plurality of edges, the at least one processor is further configured to:
    remove a first edge connected to the first vertex from the plurality of edges based on the linking rule; and
    add a second edge connected to the first vertex to the plurality of edges based on the linking rule.

11. The system of claim 10, wherein to identify a walk associated with the first vertex, the at least one processor is further configured to:
    determine whether the first vertex is part of a previously executed walk; and
    determine whether the removed first edge or the added second edge is part of the previously executed walk.

12. The system of claim 9, wherein to dynamically execute the walk, the at least one processor is farther configured to:
    set the intermediate starting vertex to the first vertex;
    load a previous intermediate state of the walk at the intermediate starting vertex; and
    execute, using the previous intermediate state, the walk from the intermediate starting vertex to generate one or more output entities.

13. The system of claim 12, wherein to execute the walk using the previous intermediate state, the at least one processor is further configured to:
    retrieve, from a walk customization document, a list of edge types to traverse from the intermediate starting vertex;
    identify edges connected to the intermediate starting vertex and having an edge type in the list of edge types;
    transmit a message from the intermediate starting vertex across the identified edges, wherein the message is received by destination vertices connected to the identified edges; and
    repeat the retrieve, the identify edges, and the transmit for each of the destination vertices.

14. The system of claim 9, wherein the at least one processor is further configured to:
    correlate each of the generated one or more output entities to a service information model that defines a plurality of base network entities used to represent an architecture of the telecommunications network.

15. The system of claim 9, wherein the at least one processor is further configured to:
    generate a visualization of communications paths within the telecommunications network using the generated one or more output entities.

16. The system of claim 9, wherein the at least one processor is further configured to:
    store the plurality of vertices and the plurality of edges of the network graph in-memory across one or more distributed computing devices.

17. A non-transitory computer-readable storage device having instructions stored thereon that, when executed by at least one computing device, cause the at least one computing device to perform operations comprising:
    receiving, from a provider-specific data source, data associated with a network entity in a telecommunications network, the received data having one or more data attribute values, wherein the telecommunications network is represented by a network graph having a plurality of vertices and a plurality of edges, each vertex associated with a corresponding network entity having a respective entity type;
    associating the received data with a first vertex in the network graph;
    retrieving, a linking rule from a provider-specific customization document, the linking rule specifying a relationship between a data attribute of a first entity type and a data attribute of a second entity type;

updating, based on the linking rule, the plurality of edges in the network graph connected to the first vertex;

identifying a walk associated with the first vertex, the walk having a walk definition that specifies an entity type of a starting vertex within the network graph; and dynamically executing the walk from an intermediate starting vertex to generate one or more output entities.

18. The non-transitory computer-readable storage device of claim 17, wherein to update the plurality of edges the operations further comprise:

removing a first edge connected to the first vertex from the plurality of edges based on the linking rule; and adding a second edge connected to the first vertex to the plurality of edges based on the linking rule.

19. The non-transitory computer-readable storage device of claim 18, wherein to identify a walk associated with the first vertex the operations further comprise:

determining whether the first vertex is part of a previously executed walk; and determining whether the removed first edge or the added second edge is part of the previously executed walk.

20. The non-transitory computer-readable storage device of claim 17, wherein to dynamically execute the walk the operations, further comprise:

setting the intermediate starting vertex to the first vertex;

loading a previous intermediate state of the walk at the intermediate starting vertex;

executing, using the previous intermediate state, the walk from the intermediate starting vertex to generate the one or more output entities.

21. The non-transitory computer-readable storage device of claim 20, wherein to execute the walk using the previous intermediate state the operations further comprise:

retrieving, from a walk customization document, a list of edge types to traverse from the intermediate starting vertex;

identifying edges connected to the intermediate starting vertex and having an edge type in the list of edge types;

transmitting a message from the intermediate starting vertex across the identified edges, wherein the message is received by destination vertices connected to the identified edges; and repeating the retrieving, the identifying edges, and the transmitting for each of the destination vertices.

22. The non-transitory computer-readable storage device of claim 17, the operations further comprising:

correlating each of the generated one or more output entities to a service information model that defines a plurality of base network entities used to represent an architecture of the telecommunications network.

23. The non-transitory computer-readable storage device of claim 17, the operations farther comprising:

generating a visualization of communications paths within the telecommunications network using the generated one or more output entities.

24. The non-transitory computer-readable storage device of claim 17, the operations further comprising:

storing the plurality of vertices and the plurality of edges of the network graph in-memory across one or more distributed computing devices.

* * * * *

UNITED STATES PATENT AND TRADEMARK OFFICE
CERTIFICATE OF CORRECTION

PATENT NO. : 10,225,159 B2  
APPLICATION NO. : 15/608694  
DATED : March 5, 2019  
INVENTOR(S) : Thomson et al.

Page 1 of 2

It is certified that error appears in the above-identified patent and that said Letters Patent is hereby corrected as shown below:

In the Specification

In Column 18, Line 38, please replace "following, claims" with --following claims--.

In the Claims

In Column 18, Line 60, in Claim 1, please replace "executing, the walk" with --executing the walk--.

In Column 18, Line 63, in Claim 2, please replace "farther comprises" with --further comprises--.

In Column 19, Lines 26-27, in Claim 5, please replace "repeating the retrieving, the identifying edges, and the transmitting" with --repeating the retrieving a list of edge types, the identifying edges, and the transmitting a message--.

In Column 20, Lines 14-15, in Claim 12, please replace "farther configured" with --further configured--.

In Column 20, Lines 34-35, in Claim 13, please replace "repeat the retrieve, the identify edges, and the transmit" with --repeat the retrieve a list of edge types, the identify edges, and the transmit a message--.

In Column 20, Line 66, in Claim 17, please replace "retrieving, a linking rule" with --retrieving a linking rule--.

In Column 21, Line 26, in Claim 20, please replace "operations, further comprise" with --operations further comprise--.

In Column 22, Lines 13-14, in Claim 21, please replace "repeating the retrieving, the identifying edges, and the transmitting" with --repeating the retrieving a list of edge types, the identifying edges, and the transmitting a message--.

Signed and Sealed this  
Thirteenth Day of August, 2019

Andrei Iancu  
*Director of the United States Patent and Trademark Office*

CERTIFICATE OF CORRECTION (continued)
U.S. Pat. No. 10,225,159 B2

In Column 22, Line 23, in Claim 23, please replace "operations farther comprising" with --operations further comprising--.